United States Patent [19]
Asaumi et al.

[11] Patent Number: 5,387,069
[45] Date of Patent: Feb. 7, 1995

[54] SELF-PROPELLED TIRE DOLLY

[75] Inventors: Masayuki Asaumi; Tokio Kanatomi, both of Tokyo; Fumio Kamanoi, Chiba, all of Japan

[73] Assignee: Bridgestone Corporation, Tokyo, Japan

[21] Appl. No.: 67,794

[22] Filed: May 27, 1993

[30] Foreign Application Priority Data

May 28, 1992 [JP] Japan .................. 4-136821

[51] Int. Cl.⁶ .............................................. B60B 29/00
[52] U.S. Cl. .................................................... 414/427
[58] Field of Search ............... 414/426, 427, 663, 664, 414/668; 254/2 R, 2 B, 2 C, 93 R; 29/273

[56] References Cited

U.S. PATENT DOCUMENTS

| | | | |
|---|---|---|---|
| 2,217,898 | 10/1940 | Gemmill | 414/427 |
| 2,410,902 | 11/1946 | Roberts | 414/427 X |
| 2,455,432 | 12/1948 | Martin | 414/427 X |
| 2,576,627 | 11/1951 | Miner | 414/427 |
| 2,903,049 | 9/1959 | Carlson | 417/427 X |
| 2,909,358 | 10/1959 | Southerwick | 254/2 B |
| 2,992,751 | 7/1961 | Quayle | 414/668 |
| 3,145,859 | 8/1964 | Barosko | 414/427 |
| 3,622,123 | 11/1971 | Le Gloan | 254/2 R |
| 3,653,527 | 4/1972 | Seymour | 414/427 |
| 3,749,265 | 7/1973 | Smith, Jr. | 414/427 |
| 3,850,321 | 11/1974 | Virnig | 414/427 |
| 4,042,139 | 8/1977 | Pernsteiner et al. | 29/273 X |
| 4,600,354 | 7/1986 | Niewald et al. | 414/427 |
| 4,771,531 | 9/1988 | Asher | 414/427 X |
| 4,801,237 | 1/1989 | Yamamoto | 414/428 |

FOREIGN PATENT DOCUMENTS

| | | | |
|---|---|---|---|
| 0544150 | 6/1993 | European Pat. Off. | |
| 2589399 | 5/1987 | France | 414/426 |
| 5417943 | 7/1979 | Japan | |
| 1132401 | 5/1989 | Japan | |
| 182902 | 6/1989 | Japan | |
| 444753 | 2/1968 | Switzerland | 414/664 |

*Primary Examiner*—David A. Bucci
*Attorney, Agent, or Firm*—Sughrue, Mion, Zinn, Macpeak & Seas

[57] ABSTRACT

A self-propelled tire dolly for transporting a tire in a working area for performing tire removal and mounting services by placing the tire on a tire-supporting section which is raised or lowered by a lifting device. The tire dolly is supported by three wheels, and a drive wheel among the three wheels is located at a central portion of the base on the rear side thereof. A steering handle is provided above the drive wheel. Since the drive wheel constituted by a single wheel and the steering handle are located in the center on this side during maneuvering, the tire dolly is easy to steer. The steering handle can be retreated from a fixed position to obtain a working space during tire removal or mounting.

16 Claims, 10 Drawing Sheets

SELF-PROPELLED TIRE DOLLY

BACKGROUND OF THE INVENTION

1. Field of the Invention

The present invention relates to a self-propelled tire dolly for transporting a tire in a working area for performing tire removal and mounting services.

2. Description of the Related Art

When removing or mounting a tire for repairing a punctured tire of a vehicle, particularly a truck or a bus (hereinafter generally referred to as a large vehicle), for changing the tire with a new one, or for rotating the tires, the operator, using a pneumatic impact wrench, consecutively loosens a plurality of (usually 8 to 10) wheel nuts while the large vehicle is jacked up, to place the tire in a removable state. Then, the individual removes the tire from the large vehicle by hand, and manually rolls the tire to a place where a tire changer and an inflator are located. Then, the tire is filled with a predetermined amount of air by the inflator.

When these operations are finished, the tire is manually rolled to the tire fitting position of the large vehicle, and the tire is put back on. After the tire is fitted, the plurality of nuts are consecutively tightened onto the lug bolts. The tire removal and mounting operation is thereby completed.

However, the above-described conventional operations involve much physical labor from the operator. In addition, when the tire is fitted, the lug bolts (inner nuts in the case of a double tire) must be positioned such that they can be inserted into wheel tightening holes, so that so-called experts' knacks and perception are required. Furthermore, since the tire is often held in the operator's arms, working clothes become stained or damaged. In particular, since tires of large vehicles can weigh 100 kg or more per unit, and the number of tires to be fitted is large, the operating efficiency for removing and mounting the tires has been very poor.

For this reason, if a tire dolly capable of supporting and transporting a tire is used, physical labor involved in transporting the tire can be alleviated. However, since the tire dolly generally travels (i.e., travels by being pushed by hand) by being supported by four wheels, the steering angle is small, so that the tire dolly cannot make sharp turns. For this reason, fine adjustment cannot be made when the tire dolly is moved to a position for supporting the tire mounted on a large vehicle which is jacked up, or when the tire dolly is moved for positioning a spare tire with respect to a wheel of the large vehicle, so that the operating efficiency is poor.

In addition, since the object of the conventional tire dolly was only to transport the tire, little working space is provided for performing an operation (nut removing or fitting operation or the like) in a state in which the tire is supported. Hence, considerable labor is still involved in the operation of removing or mounting a tire with respect to a wheel of the large vehicle.

SUMMARY OF THE INVENTION

In view of the above-described circumstances, it is an object of the present invention to provide a self-propelled tire dolly which makes it possible to obtain a wide angle of steering a drive wheel by means of a handle and to improve traveling performance.

In addition to the above object, it is another object of the present invention to provide a self-propelled tire dolly capable of obtaining a working space for an operation involved in the removal or mounting of a tire while maintaining maneuverability with the drive wheel disposed in a transversely central portion of the tire dolly.

To these ends, in accordance with the present invention, there is provided a self-propelled tire dolly for transporting a tire in a working area for performing tire removal and mounting services, comprising: a pair of castors and a drive wheel driven by a drive unit; a base having a first portion and a second portion, the first portion being supported by the pair of castors, the second portion being located on a line extending from a central point between the pair of castors in a backward direction of travel, and being supported by the drive wheel, so as to travel while being supported at three points on a surface of the working area; a handle attached to the drive wheel in the second portion for steering the drive wheel; a tire-supporting section having a projecting portion whose axis is substantially horizontal and which projects in a forward direction of the base, for supporting the tire with the tire mounted on the projecting portion; a pair of columns respectively disposed uprightly on both sides of the base; a lifting section for supporting the tire-supporting section and rendering the tire-supporting section liftable with respect to the base while being guided by the columns; driving means for lifting and lowering the lifting section with respect to the base; and retreating means for retreating the handle during removal and or mounting of nuts for mounting a tire onto a vehicle wheel, the tire being supported by the tire-supporting section.

In accordance with the present invention, since the base is supported at three points by the pair of castors and the drive wheel, it is possible to obtain a wide angle of steering the drive wheel by means of the handle. For this reason, fine adjustment at the time of alignment of lug bolt insertion holes of the tire and mounting lug bolts can be facilitated during tire removal and mounting.

In the self-propelled tire dolly in accordance with the present invention, removing the wheel nuts is performed with the tire being supported. Namely, in a state in which the vehicle is jacked up, the tire-supporting section (such as a fork) is placed in contact with a lower portion of the tire, and the wheel nuts are removed. In this case, since the space between the pair of columns and the interior of the tire-supporting section are formed as an open space, so that the operation can be effected easily. Although the handle is present in the working space because the base is supported at three points, this handle can be retreated by the retreating means after positioning of the tire dolly. As a result, the working space can be obtained, and the wheel nut-removing operation can be performed with the tire dolly placed underneath the lower portion of the tire.

Furthermore, if the handle is steered to the left or the right by a maximum amount (e.g., 90°) and is tilted with respect to the traveling surface, the handle can be retreated from the working space.

In a case where the handle and the drive wheel are coupled to each other by means of a link mechanism, and the handle is disposed on one transverse side of the base with the drive wheel disposed at the center, the working space can be maintained at all times while retaining maneuverability.

As described above, the self-propelled tire dolly in accordance with the present invention offers an outstanding advantage in that it makes it possible to obtain a wide angle of steering the drive wheel by means of the handle and to improve the traveling performance.

In addition to the above advantage, the self-propelled tire dolly in accordance with the present invention offers an advantage in that the working space for an operation involved in removing or fitting the tire can be obtained while maintaining maneuverability with the drive wheel disposed in the transversely central portion of the tire dolly.

BRIEF DESCRIPTION OF THE DRAWINGS

The above and other objects and features of the invention will become more apparent from the following detailed description when read in conjunction with the accompanying drawings, in which.

DESCRIPTION OF THE PREFERRED EMBODIMENTS

Figure 1:
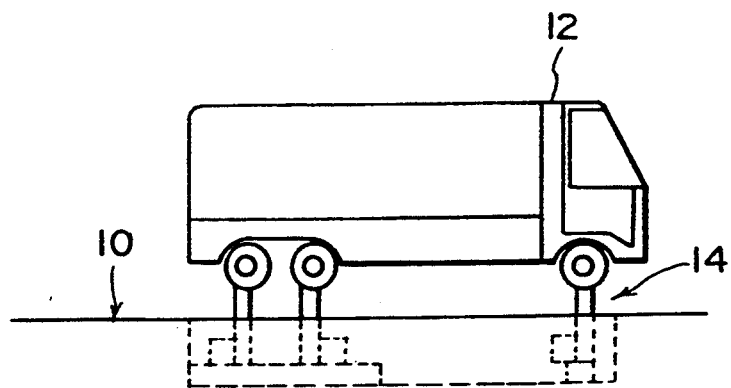
FIG. 1 is a schematic diagram illustrating a working area in which a tire dolly in accordance with an embodiment of the present invention is used.

FIG. 1 shows a working area 10 for tire removal and mounting operations of a large vehicle 12 such as a truck or a bus. A three-column movable lift 14 is embedded in a central portion of a floor, and is capable of jacking up the large vehicle 12 by abutting against the axles.

Figure 2:
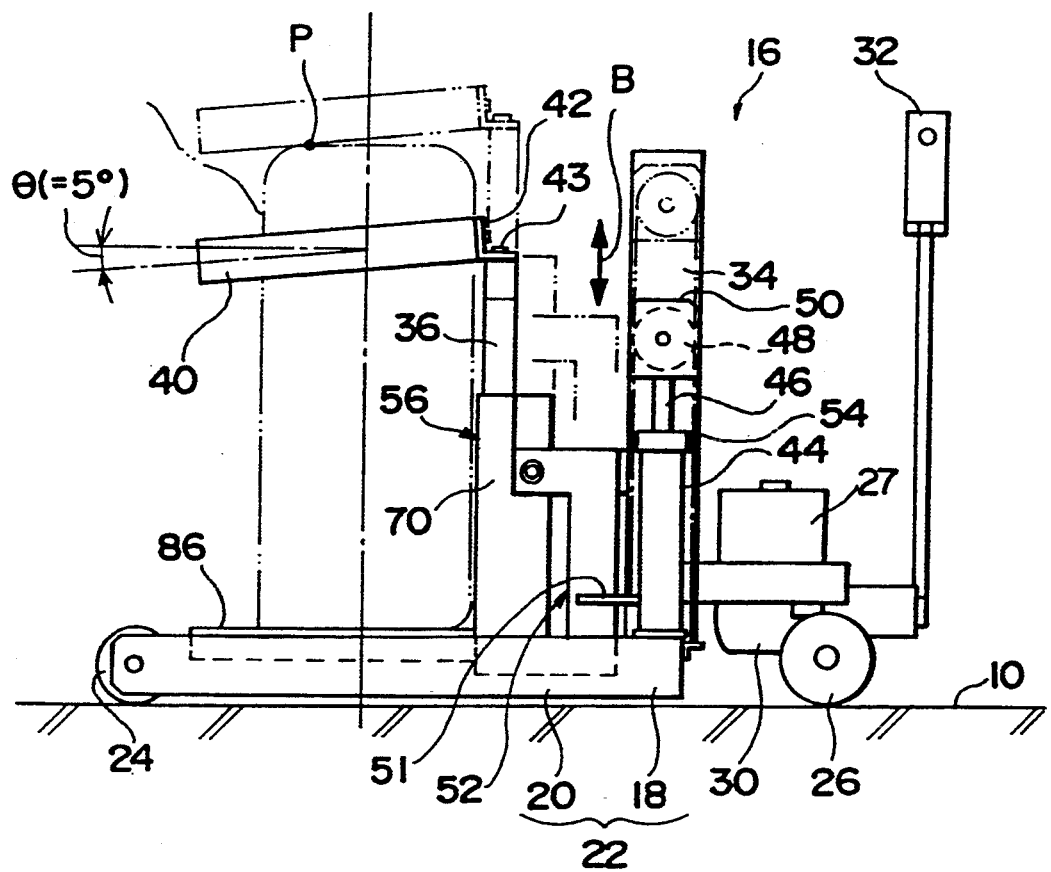
FIG. 2 is a side view of a tire dolly in accordance with the embodiment.
Figure 4:
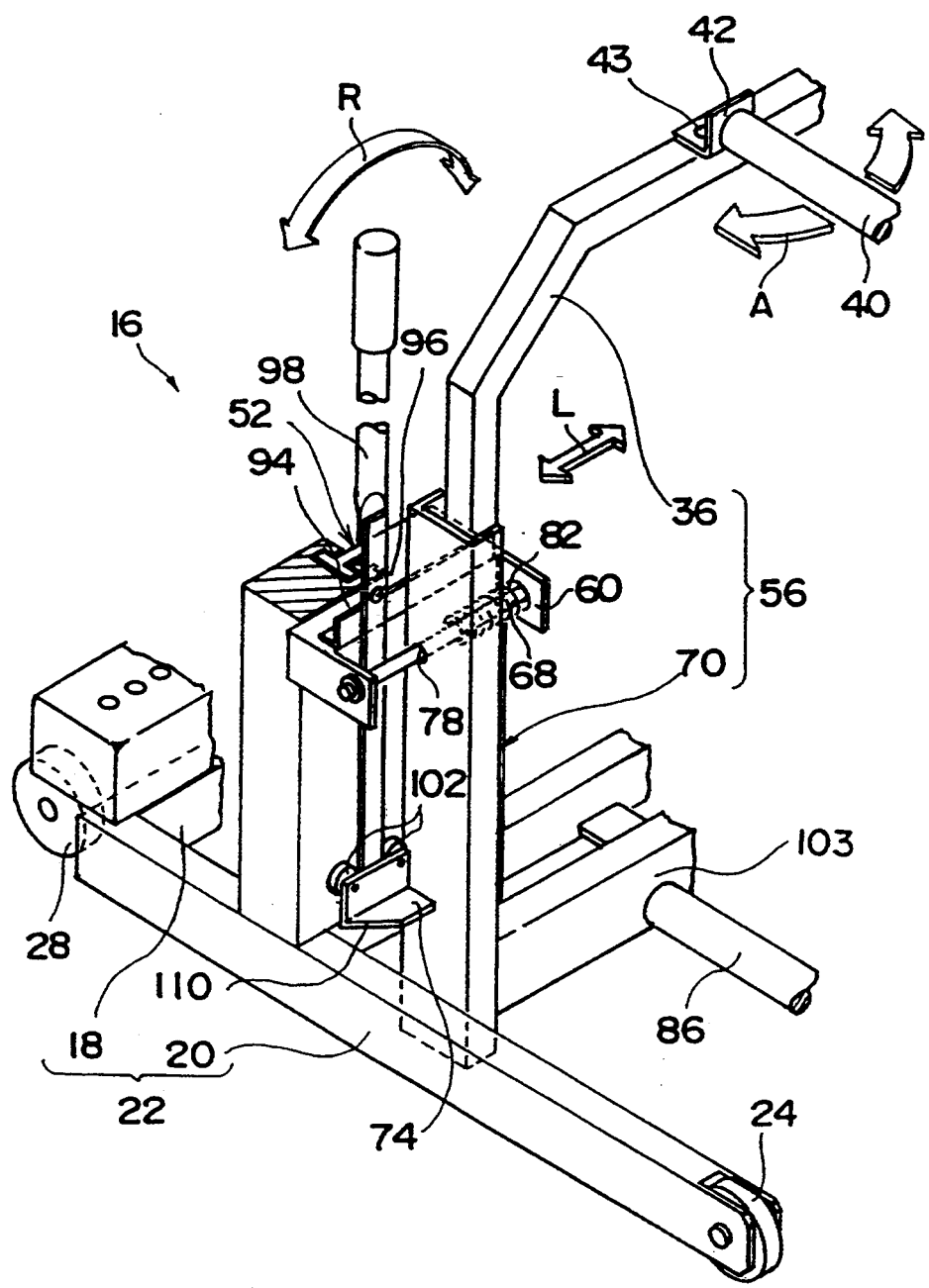
FIG. 4 is a perspective view of one side of the tire dolly.

As shown in FIGS. 2 and 4, a tire dolly 16 of the present invention is placed in the working area 10. As shown in FIG. 2, the tire dolly 16 has a U-shaped base 22 formed by a main body 18 and a pair of legs 20 which respectively project from both ends of the main body 18 and in parallel. Castors 24 are provided at the distal ends of the legs 20. In addition, a drive wheel 26 is provided at a transversely central portion of a proximal portion of the main body 18. Consequently, the base 22 is supported at three points by the pair of castors 24 and the drive wheel 26 for moving about in the working area 10. When moving, the castors 24 are on the front side and the drive wheel 26 is on the rear side.

Figure 7:
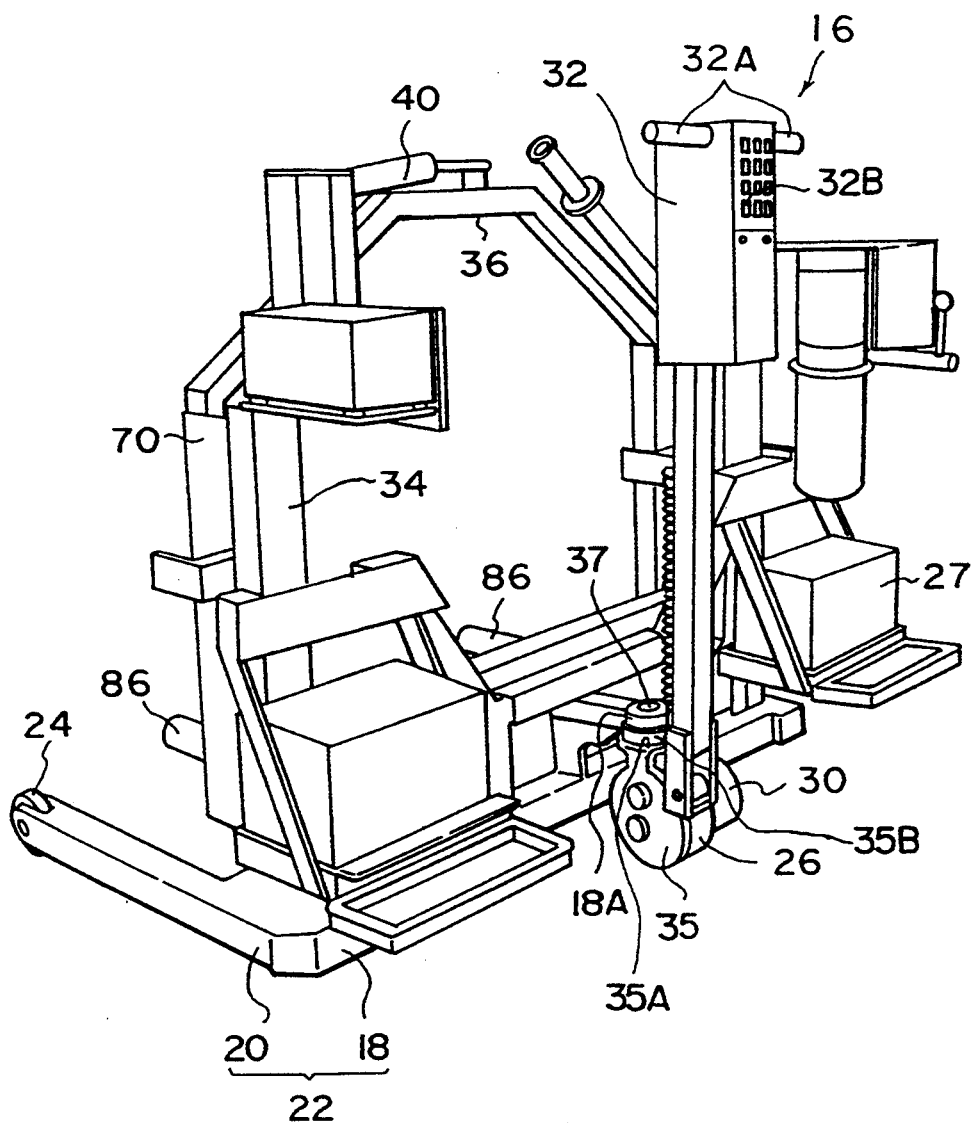
FIG. 7 is a perspective view of the overall tire dolly.

As shown in FIG. 7, the drive wheel 26 is coupled to a drive shaft of a motor 30 which is driven by a battery 27. This drive wheel 26 can be steered by a handle 32 extending above the drive wheel 26. Namely, a bracket 35, to which the drive wheel 26 is fixed, is bent in a substantially Lo shaped configuration in such a manner as to be located over the drive wheel 26. A cylindrical portion 37 is provided uprightly on an upper surface of the bent portion 35A of the bracket 35. This cylindrical portion 37 is pivotally supported on a cylinder-supporting portion 18A attached to the main body 18. An outer periphery of the cylinder-supporting portion 18A is guided by an arcuate guide wall 35B projecting from the bent portion 35A.

The drive wheel 26 becomes steerable through the relative rotation of the cylinder-supporting portion 18A and the cylindrical portion 37. For this reason, the tire dolly 16 can be easily moved anywhere in the working area 10 by means of the driving force of the motor 30 and the steering of the handle 32.

Figure 8:
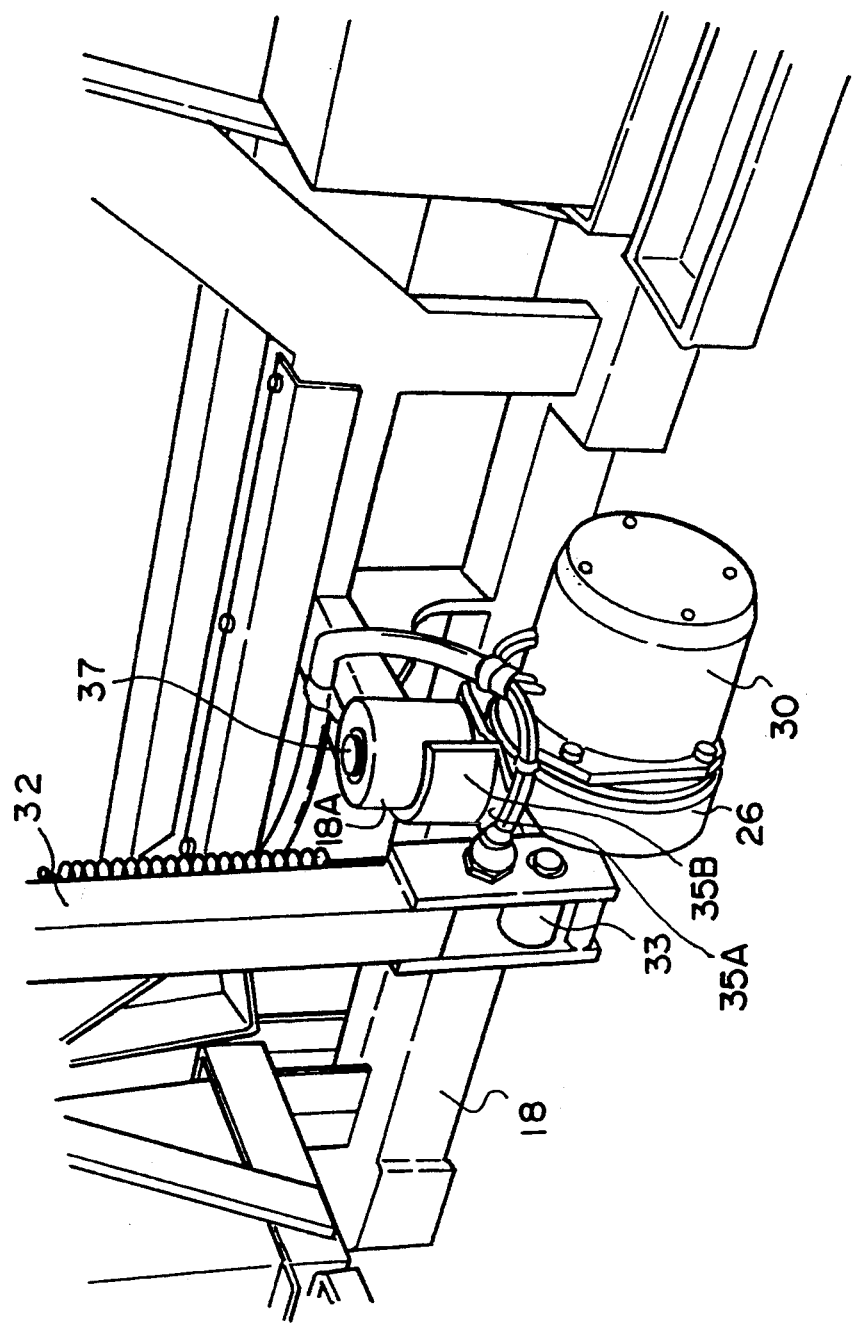
FIG. 8 is an enlarged perspective view of a coupling portion for coupling a drive wheel and a handle.

As shown in FIG. 8, since a single drive wheel is located at a transversely central position of the main body 18 of the base 22, the handle 32 is steerable 90° or more to the left and the right, i.e., clockwise and counterclockwise, respectively, in terms of its steering angle. Consequently, the minimum turning radius of the tire dolly 16 is very small, so the tire dolly 16 is capable of making a sharp turn.

Also, as shown in FIG. 8, the drive wheel 26 and a lower end of the handle 32 are coupled to each other via a shaft 33 whose axis is parallel with the traveling surface (e.g. floor). For this reason, the handle 32 is rotatable about the shaft 33 in a vertical plane parallel to the traveling direction of the tire dolly 16. Hence, when the handle 32 is operated, the heightwise position of a pair of handle grips 32A (see FIG. 7) can be altered in accordance with the position or size of the operator irrespective of the steering angle.

Figure 3:
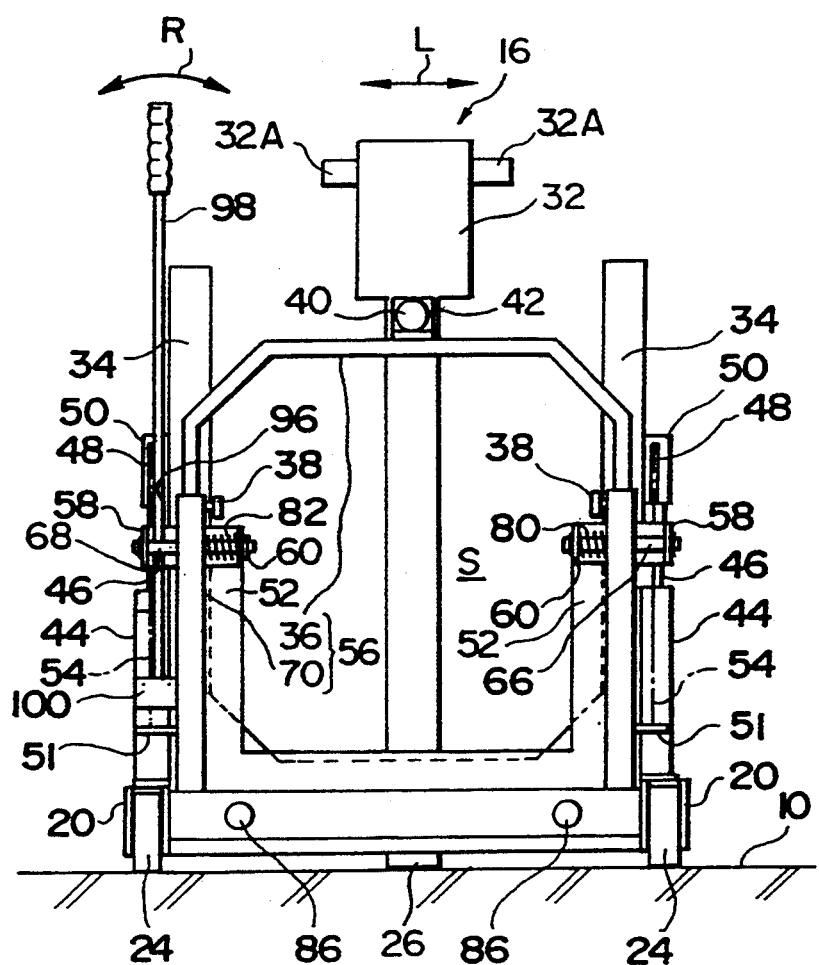
FIG. 3 is a front view of the tire dolly (viewed from the left-hand side of FIG. 2) in accordance with the embodiment.

A pair of columns 34 are provided uprightly on the base 22 of the tire dolly 16. As shown in FIGS. 2 and 3, a hydraulic cylinder 44 is provided on the outer side of each column 34, and a bracket 50 for pivotally supporting a gear 48 via a shaft is secured to a distal end of a rod 46 of the hydraulic cylinder 44. Meanwhile, a bracket 51 is secured on each of two upright portions of a lifting section 52 having a substantially U-shaped configuration as viewed from the front. An intermediate portion of a chain 54, whose one end is coupled to each of the upright portions of the lifting section 52 via the bracket 51, is wound around the gear 48. The other end of the chain 54 is retained at a predetermined position of each column 34.

As shown in FIG. 4, the lifting section 52 is liftable in the directions of double-headed arrow B in FIG. 2 while being guided along the inner surfaces of the pair of columns 34, and is supported by the aforementioned chains 54.

Here, if the rod 46 of the hydraulic cylinder 44 is extended, the position where the chain 54 is wound around the gear 48 moves, thereby making it possible to raise the lifting section 52 (see the phantom lines in FIG. 2). On the other hand, if the rod 46 is retracted, the lifting section 52 is lowered (in the state of the solid lines in FIG. 2).

As shown in FIG. 3, pairs of brackets 58 and 60 project forwardly from transversely opposite sides of the lifting section 52 and in parallel with each other. The pairs of brackets 58 and 60 are provided with circular holes formed concentrically with each other, and shafts 66 and 68 are inserted therein, respectively.

A tire-supporting section 56 is supported by the lifting section 52 via these shafts 66 and 68. A hollow main body 70 of the tire-supporting section 56 is formed in a substantially U-shaped configuration as viewed from the front. Upright portions of the main body 70 are each provided with a U-shaped cross section, opposing sides of the upright portions being open. Upper ends of the upright portions of the main body 70 are also open. Both ends of a movable frame 36 bent in the shape of a half octagon are respectively inserted into openings at the upper ends of the main body 70. The movable frame 36 is made vertically movable with respect to the columns 34 and can be fixed at a predetermined position by means of locking screws 38.

A holding roller 40 is attached to a horizontal portion of the movable frame 36 via an L-bracket 42. This L-bracket 42 is pivotally supported at an upper end surface of the movable frame 36 via a shaft 43. Consequently, the holding roller 40 is rotatable in the directions of double-headed arrow A in FIG. 4 about the shaft 43 between a position (retract position) in which the holding roller 40 is parallel with the movable frame 36 in a plan view and a position (holding position) in which the holding roller 40 projects forwardly and perpendicularly to the movable frame 36. In addition, as shown in FIG. 2, the axis of this holding roller 40 with respect to a horizontal line is inclined downward with an angle $\Theta$ of about 5°. As a result, a point P at which a tire 84 is held (see FIG. 2) is located more closely to the castor 24 side than the equator of the tire 84, i.e., the holding point P is located forwardly of the equator of the tire 84.

As shown in FIG. 4, vertical frame portions of both sides of the main body 70 of the tire-supporting section 56 are respectively provided with circular holes 78 penetrating the vertical frame portions (only one side is shown in FIG. 4). Intermediate portions of the shafts 66 and 68 are inserted therein, respectively. As a result, the tire-supporting section 56 is movable in the transverse direction (in the direction of the axes of the shafts 66 and 68) along the shafts 66 and 68 (the lifting section 52 and the tire-supporting section 56 become movable relative to each other).

As shown in FIG. 3, compression coil springs 80 and 82 are respectively fitted onto the shafts 66 and 68 between the main body 70 of the tire-supporting section 56 and an inward portion of the bracket 60. Consequently, by virtue of balancing the urging forces of these compression coil springs 80 and 82, the tire-supporting section 56 is held at a position in which the distance from the inward portion of the bracket is fixed for both the left- and right-hand sides thereof.

The urging forces of the compression coil springs 80 and 82 are not very large but are such that the tire-supporting section 56 moves at least in a state in which the tire 84 is not supported.

A horizontal frame 103 of the main body 70 in the tire-supporting section is provided with a pair of rollers 86 projecting in the forward direction of the tire dolly 16. When the tire dolly 16 is moved and the pair of rollers 86 are located below the tire 84 to be removed from the jacked-up large vehicle 12, the tire 84 can be supported by the rollers 86.

Figure 5:
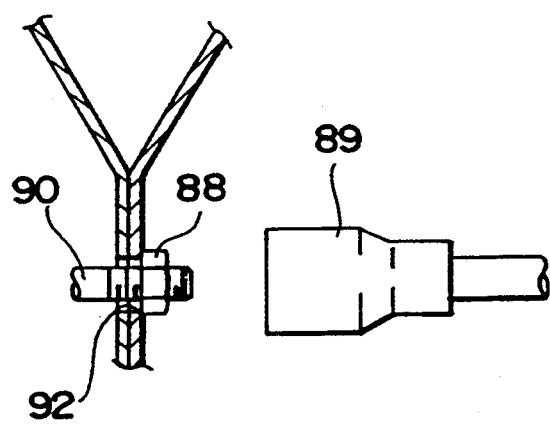
FIG. 5 is a cross-sectional view taken along line 5—5 in FIGS. 6A and 6B.

Namely, as shown in FIG. 5, if the tire dolly 16 is backed up in a state in which the tire 84 (see FIGS. 6A and 6B), from which wheel-mounting nuts 88 are all removed by a wrench 89, is supported by the lifting section 52, the tire 84 can be removed smoothly without interference between wheel-mounting bolts 90 and wheel-mounting holes 92.

Figure 6A:
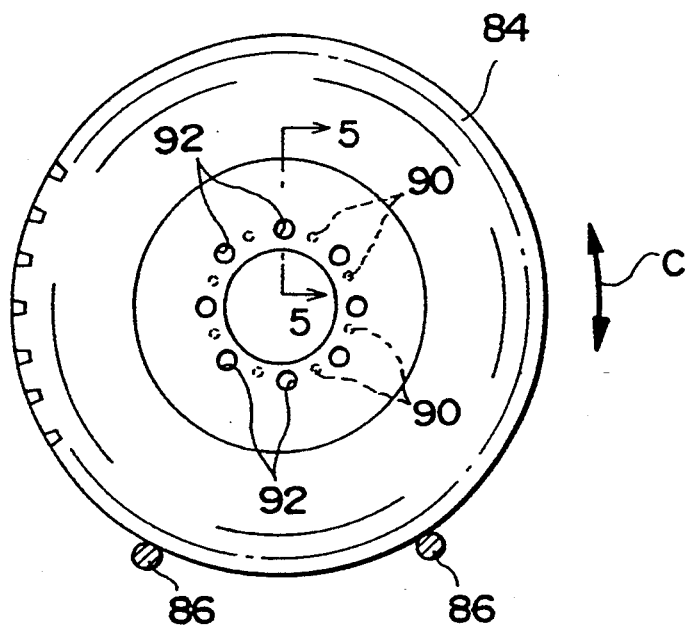
FIG. 6A is a front view of the tire illustrating a state in which the tire is supported on rollers with wheel-mounting nuts and bolts being offset from each other in the direction of a pitch circle.

In addition, since the tire 84 is supported by the rollers 86, as shown in FIG. 6A, the tire 84 can be rotated easily about its axis (in the directions of double-headed arrow C in FIG. 6A). This rotation of the tire 84 corrects the misalignment of the wheel-mounting bolts 90 with respect to the wheel-mounting holes 92 in the direction of the pitch circle when mounting the tire 84.

As shown in FIG. 4, a lower horizontal portion of an L-bracket 94 is secured on top of one upright portion of the lifting section 52, while an intermediate portion of a lever 98 is pivotally supported by an upright portion of the L-bracket 94 via a shaft 96. As a result, the lever 98 is rotatable about the shaft 96 in the directions of double-headed arrow R in FIG. 4.

An upper end portion of the lever 98 is formed as a grip, and a lower end portion thereof extending downwardly from the shaft 96 is passed through a frame formed by the shaft 68, the bracket 58, and the lifting section 52, and is disposed in such a manner as to be located adjacent a bracket 100 secured to the main body 70 of the tire-supporting section 56. A pair of roller-shaped receiving members 102 having axes which are horizontal and parallel with each other are attached to the bracket 100. Both sides of a lower end of the aforementioned lever 98 are clamped by these receiving members 102. As a result, if the lever 98 is rotated, the shaft 96 serves as a fulcrum, abutting portions against the receiving members 102 serve as points of application, and the tire-supporting section 56 can be moved in the transverse direction (in the directions of double-headed arrow L in FIG. 4) along the shafts 66 and 68 against the urging forces of the compression coil springs 80 and 82.

Figure 6B:
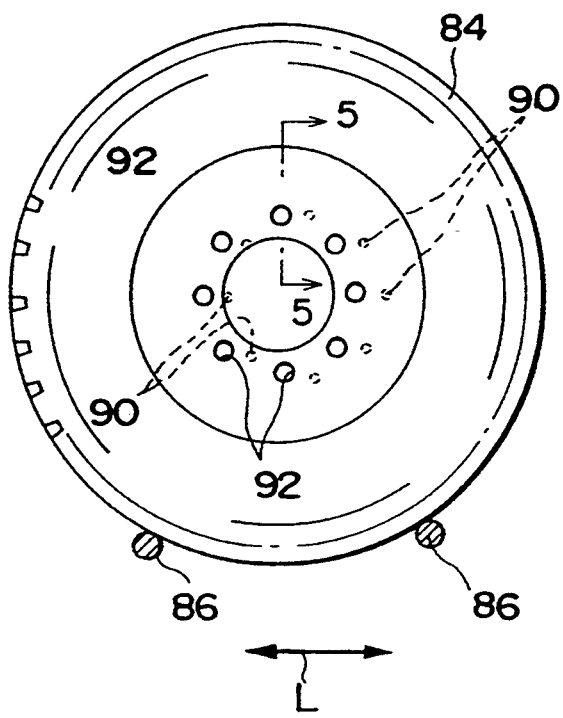
FIG. 6B is a front view of the tire illustrating a stale in which the tire is supported on rollers with wheel-mounting nuts and bolts being offset from each other in a horizontal direction.

As shown in FIG. 6B, the transverse movement of the tire-supporting section 56 by using this lever 98 corrects the misalignment of the wheel-mounting lug bolts 90 with respect to the wheel-mounting holes 92 in the horizontal direction when mounting the tire 84.

In the tire dolly 16 of this embodiment, a large working space S is formed in a central portion thereof, as shown in FIG. 3. By virtue of this working space S, the operator is able to thread the wheel-mounting nuts 88 from the rear of the tire dolly 16 in a state in which the rollers 86 of the tire dolly 16 are inserted below the tire 84 which is to be removed or fitted.

Figure 9:
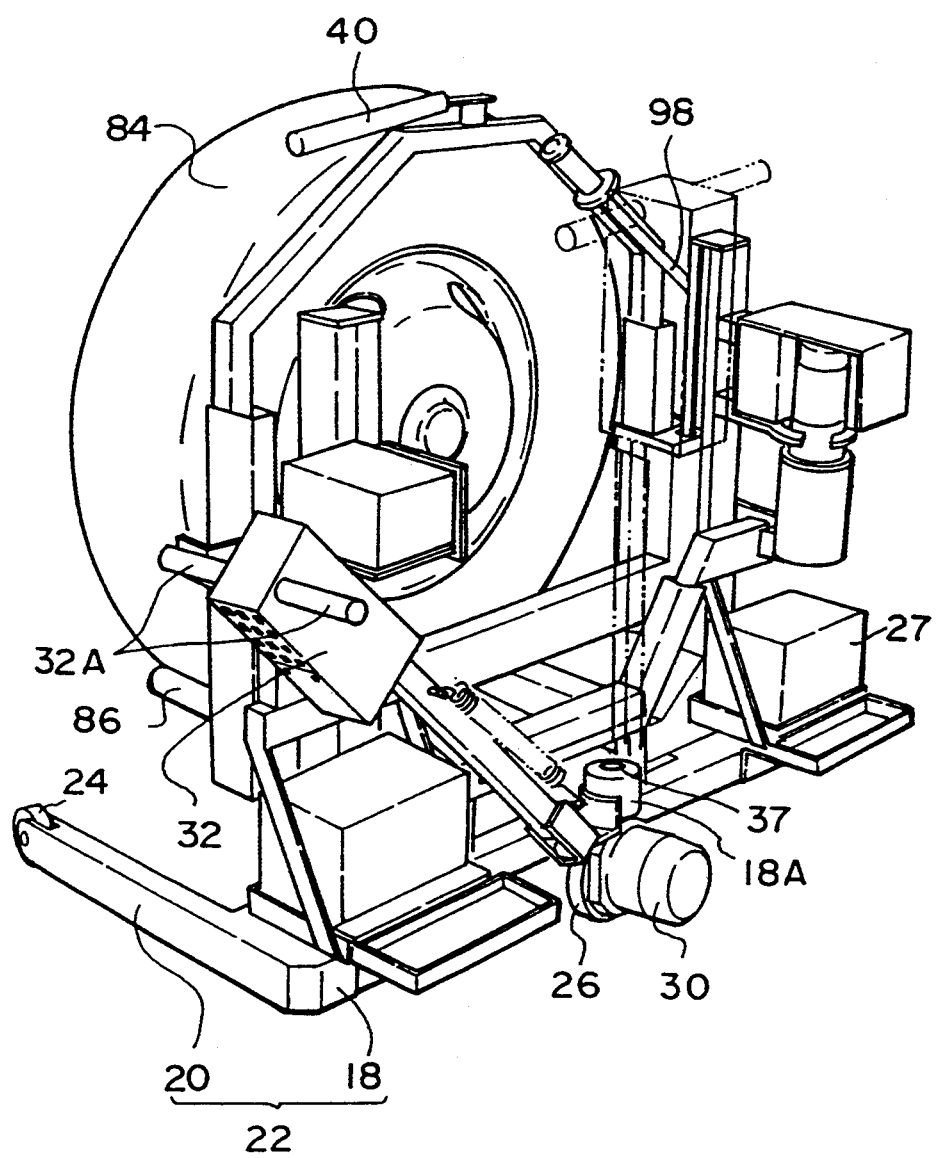
FIG. 9 is a perspective view of the tire dolly in which the handle is retreated.

The handle 32 is disposed vertically in the area of this working space S. For this reason, the handle 32 constitutes a hindrance to operation, but, in this embodiment, if the handle 32 is steered 90° to either the left or the right (e.g., to the right) and is tilted sideways approximately 45°, as shown in FIG. 9, the handle 32 can be taken out of the working space S. It should be noted that switches 32B for commanding the forward or backward movement for self-propulsion or commanding the vertical movement of the lifting section 52 are provided on the handle 32 as a unit.

The operation of this embodiment will be described hereafter.

The large vehicle 12 is guided and moved into a central portion of the working area 10. After being moved to a predetermined position, the three-column movable lift 14 is raised to jack up the large vehicle 12.

By maneuvering the tire dolly 16, the operator allows the rollers 86 to be inserted at the bottom side of the outer periphery of the tire 84 that is to be removed. At this time, the tire dolly 16 is supported at three points on the floor surface by means of the pair of castors 24 and the drive wheel 26. Since the handle 32 for steering the drive wheel 26 is located at the transversely central position, a wide steering angle can be obtained. Accordingly, fine adjustment is facilitated at the time of insertion of the rollers 86, so that the rollers 86 can be simply inserted at the bottom side of the outer periphery of the tire 84.

Next, the lifting section 52 is raised until the rollers 86 abut the tire 84. In this case, although the tire-supporting section 56 is transversely movable with respect to the lifting section 52, the undesirable situation of the tire 84 being supported only by one of the rollers 86 does not occur. This is because the center of the tire-supporting section 56 and the center of the lifting section 52 are aligned by the balancing urging forces of the compression coil springs 80 and 82.

In a case where the tire 84 is a rear wheel of the large vehicle 12, the locking screws 38 are loosened to move the movable frame 36 to a position adjusted to the tire diameter. The locking screws 38 are tightened again so as to be fixed. In this state, the holding roller 40 is moved from the retreated position to the holding position, i.e., is arranged to project in the forward direction of the tire dolly 16. Consequently, the upper end portion of the tire 84 can be held. Since the holding roller 40 is inclined downward about 5° to allow the holding point P to be located forwardly of the equator of the tire 84, the tire 84 can be held reliably with respect to slight vibrations when the tire dolly 16 is driven.

In the case of a front wheel of the large vehicle 12, since the clearance between the tire 84 to be replaced and a fender portion is small, it suffices if the holding roller 40 is set in its retracted position. In addition, as for the front wheel, since the load balance acts in the direction of falling toward the tire-supporting section 56 side, the holding roller 40 becomes unnecessary.

Here, in the tire dolly 16 of this embodiment, the working space S is at the center. But the handle 32 is usually located in this working space S. Therefore, this handle 32 is steered 90° to the right and is concurrently tilted sideways approximately 45° about the shaft 33. As a result, the handle 32 is held at the position out of the working space S, thereby making it possible to obtain a working space S.

Subsequently, the tire 84, from which the wheel-mounting nuts 88 are all removed, is supported by the rollers 86 of the lifting section 52 of the tire dolly 16. Upon completion of this operation, the handle 32 is returned to the original position, and the tire dolly 16 is moved backward. At this time, since the tire 84 is supported by the rollers 86 of the lifting section 52, the tire 84 can be removed smoothly from the wheel-mounting lug bolts 90 without interference between the wheel-mounting lug bolts 90 and the wheel-mounting holes 92.

The tire 84 moved backward by the tire dolly 16 is held by a hanger or the like, is transported to a predetermined operating machine (e.g., a tire changer or an air inflator) to perform operations. Upon completion of the air inflating operation which is performed after the repair of a punctured tire, the tire 84 is held again by the hanger, and is placed on the rollers 86 of the lifting section 52.

The tire dolly 16 is moved toward the large vehicle 12. At this time, there are cases where the wheel-mounting bolts 90 and the wheel-mounting holes 92 are not aligned. This misalignment includes misalignment in the direction of the pitch circle and misalignment in the horizontal direction.

In the case of misalignment in the direction of the pitch circle, since the tire 84 is supported on the rollers 86, the tire 84 can be axially rotated by the operator with ease, so that the axes of the wheel-mounting lug bolts 90 and the axes of the wheel-mounting holes 92 can be readily aligned with each other, allowing the tire 84 to be refitted easily.

As for misalignment in the horizontal direction, it has conventionally been necessary to drive the tire dolly 16 itself to make the adjustment. In this embodiment, however, as the operator rotates the lever 98 about the shaft 96 in the directions of double-headed arrow R in FIG. 4 by gripping the upper end of the lever 98, the tire-supporting section 56 can be moved in the directions of double-headed arrow L (FIG. 3) along the shafts 66 and 68, thereby making it possible to easily correct the misalignment in the horizontal direction. In this case, since the tire 84 is in a supported state, the tire 84 is held at the adjusted position by means of the load of the tire 84 without being affected by the urging forces of the compression coil springs 80 and 82.

Next, after the handle 32 is retracted from the working space S, the wheel-mounting nuts 88 are retightened, and the three-column movable lift 14 is lowered, thereby completing the repairing operation of the punctured tire.

Thus, in this embodiment, since the operator need not physically hold the tire 84 or roll it, labor is significantly alleviated, and the operator's working clothes are not stained or damaged. In addition, since the handling of the tire 84 having a heavy weight is automatically done, excellent safety features are obtained.

Since the tire dolly travels while being supported at three points by the pair of castors 24 and the drive wheel 26, a wide steering angle can be obtained, and since the drive wheel 26 serving as the steering wheel is located in the transversely central portion of the tire dolly, maneuverability improves.

When the operator is removing or mounting the tire behind the tire dolly 16, since the handle 32 can be tilted sideways approximately 45° while being steered 90°, the handle 32 can be readily taken out of the working space S. Hence, efficiency in tire removal or mounting is not hindered.

Although, in this embodiment, the operating procedure has been described by using the repair of a punctured tire as an example, the same procedure is taken in the replacement of a tire with a new one.

Although, in this embodiment, the tire-supporting section 56 is moved sideways via the receiving members 102 through the swinging motion of the lever 98, the tire-supporting section 56 may be electrically moved sideways by using a ball screw or the like.

Figure 10:
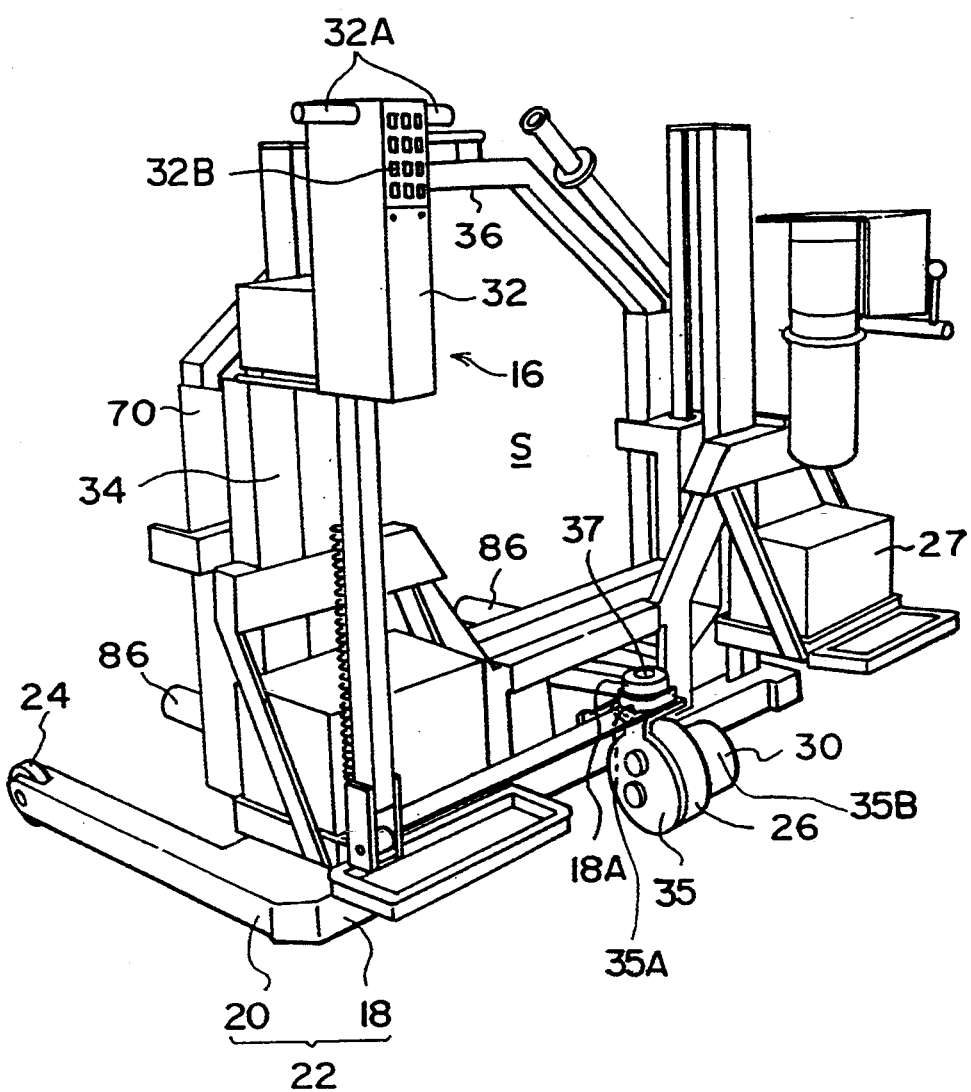
FIG. 10 is a perspective view of the tire dolly in which the handle is located on one transverse side of a base.

Furthermore, although, in this embodiment, the handle 32 and the drive wheel 26 are coupled to each other via the shaft 33, an arrangement may be adopted such that, as shown in FIG. 10, the drive wheel 26 is located in the transversely central portion of the tire dolly 16, and the handle 32 is offset toward one transverse side by the use of a link mechanism or the like. In this arrangement, the working space S can be maintained at all times, and the handle 32 need not be taken out therefrom.

What is claimed is:

1. A self-propelled tire dolly for transporting a tire in a working area for performing tire removal and mounting services, comprising:
   a pair of castors and a drive wheel driven by a drive unit;
   a base having a first portion and a second portion, said first portion being supported by said pair of castors, said second portion being located on a line extending from a central point between said pair of castors in a backward direction of travel, and being supported by said drive wheel, so as to travel while being supported at three points on a surface of the working area;
   a tire-supporting section for supporting the tire;
   a lifting device for supporting said tire-supporting section and rendering said tire-supporting section liftable with respect to said base;
   steering means for steering said drive wheel wherein said lifting device comprises a lift including a pair of columns respectively disposed uprightly on both sides of said base and a lifting section raised or lowered by being guided by said columns, and driving means for lifting or lowering said lifting section with respect to said base;
   guide means for guiding said tire-supporting section movable toward each side of said tire dolly relative to said lifting section;
   moving means for moving said tire-supporting section relative to said lifting section;
   urging means for urging said tire-supporting section in such a manner that a central portion, as viewed in a direction perpendicular to the direction of travel, of said tire-supporting section comes to be located at a predetermined position in a horizontal direction at least when in a state in which said tire-supporting section is not supporting the tire, wherein said means moves said tire-supporting section relative to said lifting section against an urging force of said urging means.

2. A self-propelled tire dolly according to claim 1, wherein said steering means is constituted by a handle attached to said drive wheel in said second portion.

3. A self-propelled tire dolly according to claim 2, further comprising:
   retreating means for retreating said handle during removal and mounting of nuts for mounting a tire onto a vehicle wheel, said tire being supported by said tire-supporting section.

4. A self-propelled tire dolly for transporting a tire in a working area for performing tire removal and mounting services, comprising:
   a pair of castors and a drive wheel driven by a drive unit;
   a base having a first portion and a second portion, said first portion being supported by said pair of castors, said second portion being located on a line extending from a central point between said pair of castors in a backward direction of travel, and being supported by said drive wheel, so as to travel while being supported at three points on a surface of the working area;
   a handle attached to said drive wheel in said second portion for steering said drive wheel;
   a tire-supporting section having a projecting portion whose axis is substantially horizontal and which projects in a forward direction of said base, for supporting the tire with the tire mounted on said projecting portion;
   a pair of columns respectively disposed uprightly on both sides of said base;
   a lifting section for supporting said tire-supporting section and rendering said tire-supporting section liftable with respect to said base while being guided by said columns;
   driving means for lifting or lowering said lifting section with respect to said base;
   retracting means for retracting said handle during removal and mounting of nuts for mounting a tire onto a vehicle wheel, said tire supported by said tire-supporting section;
   guide means for guiding said tire-supporting section movably toward each side of said tire dolly relative to said lifting section;
   moving means for moving said tire-supporting section relative to said lifting section;
   urging means for urging said tire-supporting section in such a manner that a central portion, as viewed in a direction perpendicular to the direction of travel, of said tire-supporting section comes to be located on a line extending from a central point between said pair of columns in a forward direction at least wherein a state in which said tire-supporting section is not supporting the tire, wherein said moving means moves said tire-supporting section relative to said lifting section against an urging force of said urging means.

5. A self-propelled tire dolly according to claim 4, wherein said tire-supporting section has a frame-shaped proximal portion in which a central portion as viewed in the direction of travel is formed as a space, wherein said retracting means retracts said handle in such a manner that said handle does not substantially face a plane surrounded by a frame-shaped portion of said proximal portion in the direction of travel.

6. A self-propelled tire dolly according to claim 4, wherein said retracting means is constituted by a structure of said handle which permits said handle to be steered over a wide angle in clockwise and counterclockwise directions with respect to a forward direction and then be tilted with respect to a traveling surface.

7. A self-propelled tire dolly for transporting a tire in a working area for performing tire removal and mounting services, comprising:
   a pair of castors and a drive wheel driven by a drive unit;
   a base having a first portion and a second portion, said first portion being supported by said pair of castors, said second portion being located on a line extending from a central point between said pair of castors in a backward direction of travel, and being supported by said drive wheel, so as to travel while being supported at three points on a surface of the working area;
   a handle attached to said drive wheel in said second portion for steering said drive wheel;
   a tire-supporting section having a projecting portion whose axis is substantially horizontal and which projects in a forward direction of said base, for supporting the tire with the tire mounted on said projecting portion;
   a pair of columns respectively disposed uprightly on both sides of said base;
   a lifting section for supporting said tire-supporting section and rendering said tire-supporting section liftable with respect to said base while being guided by said columns;

driving means for lifting or lowering said lifting section with respect to said base;

retracting means for retracting said handle during removal and mounting of nuts for mounting a tire onto a vehicle wheel, said tire supported by said tire-supporting section;

a holding roller for holding an upper end of the tire and supported by said tire-supporting section movably in a vertical direction, said holding roller being supported movably between a position for holding the upper end of the tire and a retracted position.

8. A self-propelled tire dolly according to claim 7, wherein said holding roller is inclined diagonally downward with a distal end thereof being lower than a proximal end thereof.

9. A self-propelled tire dolly according to claim 7, wherein a pair of rollers which are rotatable with the tire supported thereon are attached to said projecting portion of said tire dolly.

10. A self-propelled tire dolly according to claim 7, wherein said handle is provided with a command unit for commanding forward and backward movement of said tire dolly for self-propulsion and for commanding the vertical movement of said lifting section.

11. A self-propelled tire dolly for transporting a tire in a working area for performing tire removal and mounting services, comprising:

a pair of castors and a drive wheel driven by a drive unit;

a base having a first portion and a second portion, said first portion being supported by said pair of castors, said second portion being located on a line extending from a central point between said pair of castors in a backward direction of travel, and being supported by said drive wheel, so as to travel while being supported at three points on a surface of the working area;

a tire-supporting section for supporting the tire;

a lifting device for supporting said tire-supporting section and rendering said tire-supporting section liftable with respect to said base;

a handle disposed on one transverse side of said base to steer said drive wheel; and a coupling mechanism for coupling together said drive wheel and said handle;

guide means for guiding said tire-supporting section movably toward each side of said tire dolly relative to said lifting device;

moving means for moving said tire-supporting section relative to said lifting device;

urging means for urging said tire-supporting section in such a manner that a central portion, as viewed in a direction perpendicular to the direction of travel, of said tire-supporting section comes to be located at a predetermined position in a horizontal direction at least when in a state in which said tire-supporting section is not supporting the tire, wherein said moving means moves said tire-supporting section relative to said lifting device against an urging force of said urging means.

12. A self-propelled tire dolly according to claim 11, wherein said coupling mechanism is constituted by a link mechanism.

13. A self-propelled tire dolly for transporting a tire in a working area for performing tire removal and mounting services, comprising:

a pair of castors and a drive wheel driven by a drive unit;

a base having a first portion and a second portion, said first portion being supported by said pair of castors, said second portion being located on a line extending from a central point between said pair of castors in a backward direction of travel, and being supported by said drive wheel, so as to travel while being supported at three points on a surface of the working area;

a tire-supporting section for supporting the tire;

a lifting device for supporting said tire-supporting section and rendering said tire-supporting section liftable with respect to said base;

steering means for steering said drive wheel; and a retaining roller for retaining an upper end of the tire and supported by said tire-supporting section movably in a vertical direction, said retaining roller being supported movably between a position for retaining the upper end of the tire and a retracted position.

14. A self-propelled tire dolly according to claim 13, wherein said retaining roller is inclined diagonally downward with a distal end thereof being lower than a proximal end thereof.

15. A self-propelled tire dolly for transporting a tire in a working area for performing tire removal and mounting services, comprising:

a pair of castors and a drive wheel driven by a drive unit;

a base having a first portion and a second portion, said first portion being supported by said pair of castors, said second portion being located on a line extending from a central point between said pair of castors in a backward direction of travel, and being supported by said drive wheel, so as to travel while being supported at three points on a surface of the working area;

a tire-supporting section for supporting the tire;

a lifting device for supporting said tire-supporting section and rendering said tire-supporting section liftable with respect to said base;

a handle disposed on one transverse side of said base to steer said drive wheel; and a retaining roller for holding an upper end of the tire and supported by said tire-supporting section movably in a vertical direction, said retaining roller being supported movably between a position for holding the upper end of the tire and a retracted position.

16. A self-propelled tire dolly according to claim 15, wherein said retaining roller is inclined diagonally downward with a distal end thereof being lower than a proximal end thereof.

* * * * *